(12) United States Patent
Schutt et al.

(10) Patent No.: US 10,926,816 B2
(45) Date of Patent: Feb. 23, 2021

(54) ACCELEROMETER SENSOR ARRANGEMENT FOR FIFTH WHEEL HITCH ASSEMBLY

(71) Applicant: SAF-HOLLAND, Inc., Muskegon, MI (US)

(72) Inventors: Randy L. Schutt, Holland, MI (US); Thomas D. Stoll, Grand Rapids, MI (US)

(73) Assignee: SAF-HOLLAND, Inc., Muskegon, MI (US)

( * ) Notice: Subject to any disclaimer, the term of this patent is extended or adjusted under 35 U.S.C. 154(b) by 217 days.

(21) Appl. No.: 16/164,310

(22) Filed: Oct. 18, 2018

(65) Prior Publication Data

US 2019/0118876 A1    Apr. 25, 2019

Related U.S. Application Data

(60) Provisional application No. 62/574,486, filed on Oct. 19, 2017.

(51) Int. Cl.
*B62D 53/10* (2006.01)
*B62D 53/12* (2006.01)

(52) U.S. Cl.
CPC ............. *B62D 53/10* (2013.01); *B62D 53/12* (2013.01)

(58) Field of Classification Search
CPC ......... B62D 53/08; B62D 53/10; B62D 53/12
USPC ....................................................... 280/434
See application file for complete search history.

(56) References Cited

U.S. PATENT DOCUMENTS

| 4,003,241 | A | 1/1977 | Thomas |
| 4,849,655 | A | 7/1989 | Bennett |
| 5,226,675 | A | 7/1993 | Noah et al. |
| 6,302,424 | B1 * | 10/2001 | Gisinger ................ B62D 53/08 280/433 |
| 6,498,976 | B1 | 12/2002 | Ehlbeck et al. |
| 7,272,481 | B2 | 9/2007 | Einig et al. |
| 9,723,692 | B2 * | 8/2017 | Sibley, Jr. ............. B62D 53/08 |
| 10,202,106 | B1 | 2/2019 | Leone |
| 2005/0027377 | A1 | 2/2005 | Lucas et al. |
| 2005/0161902 | A1 | 7/2005 | Dupay et al. |
| 2006/0186636 | A1 | 8/2006 | Shutt et al. |
| 2011/0127750 | A1 * | 6/2011 | Mann ..................... B62D 53/10 280/437 |
| 2012/0024081 | A1 | 2/2012 | Baker |
| 2013/0079980 | A1 | 3/2013 | Vuk et al. |
| 2013/0253814 | A1 | 9/2013 | Wirthlin |
| 2014/0025245 | A1 * | 1/2014 | Fanourakis ........... B62D 53/06 701/22 |

(Continued)

*Primary Examiner* — Tony H Winner
(74) *Attorney, Agent, or Firm* — Price Heneveld LLP

(57) ABSTRACT

A fifth wheel hitch assembly includes a fifth wheel hitch plate having a body portion and a pair of extensions extending outwardly from the body portion, wherein the extensions cooperate to form a throat therebetween, a locking arrangement moveable between an unlocked position where a kingpin may be moved into and out of the throat, and a locked position where the kingpin is prevented from being removed from within the throat, and a sensor arrangement that includes at least one sensor located within at least one component of the locking arrangement, wherein the at least one sensor includes an accelerometer configured to sense vibrational movement of the at least one component of the locking arrangement.

32 Claims, 3 Drawing Sheets

(56) References Cited

U.S. PATENT DOCUMENTS

| | | |
|---|---|---|
| 2015/0102583 A1 | 4/2015 | Reimer |
| 2016/0339836 A1 | 11/2016 | Sibley, Jr. et al. |
| 2017/0174019 A1 | 6/2017 | Lurie |
| 2017/0174275 A1 | 6/2017 | Mohamad Jembari et al. |
| 2019/0329612 A1* | 10/2019 | Gaufin .................. B60D 1/015 |

* cited by examiner

ACCELEROMETER SENSOR ARRANGEMENT FOR FIFTH WHEEL HITCH ASSEMBLY

CROSS-REFERENCE TO RELATED APPLICATIONS

This application claims the benefit of U.S. Provisional Patent Application No. 62/574,486, filed on Oct. 19, 2017, entitled "ACCELEROMETER SENSOR ARRANGEMENT FOR FIFTH WHEEL HITCH ASSEMBLY," the entire disclosure of which is incorporated herein by reference.

BACKGROUND OF THE INVENTION

The embodiments as disclosed herein relate to a fifth wheel hitch assembly, and in particular to a fifth wheel hitch assembly that includes a sensor arrangement configured to monitor the vibrational characteristics of components of the fifth wheel hitch assembly for determining excessive wear of the components.

BRIEF SUMMARY OF THE INVENTION

One embodiment provides a fifth wheel hitch assembly that includes a fifth wheel hitch plate having a body portion and a pair of extensions extending outwardly from the body portion, wherein the extensions cooperate to form a throat therebetween, a locking arrangement moveable between an unlocked position where a kingpin may be moved into and out of the throat, and a locked position where the kingpin is prevented from being removed from within the throat, and a sensor arrangement that includes at least one sensor located within at least one component of the locking arrangement, wherein the at least one sensor includes an accelerometer configured to sense vibrational movement of the at least one component of the locking arrangement.

Another embodiment provides a method for monitory wear of a locking arrangement of a fifth wheel hitch arrangement, the method including providing a fifth wheel hitch plate having a body portion and a pair of extensions extending outwardly from the body portion, wherein the extensions cooperate to form a throat therebetween, providing a locking arrangement moveable between an unlocked position where a kingpin may be moved into and out of the throat, and a locked position where the kingpin is prevented from being removed from within the throat, and providing a sensor arrangement that includes at least one sensor located within at least one component of the locking arrangement, wherein the at least one sensor includes an accelerometer configured to sense vibrational movement of the at least one component of the locking arrangement. The embodiment further includes providing a controller operably coupled with the at least one sensor of the sensor arrangement, sensing a baseline vibrational characteristic of the at least one component and communication the baseline vibrational characteristic with the controller, sensing a subsequent vibrational characteristic of the at least one component and communication the subsequent vibrational characteristic with the controller, and comparing the subsequent vibrational characteristic against the baseline vibrational characteristic within the controller and determining whether a threshold deviation has been met.

Yet another embodiment includes a locking jaw for a fifth wheel hitch assembly including a first end having a pivot aperture configured to receive a pin therein to pivotably couple the locking jaw to a fifth wheel hitch plate, a second end opposite the first end, an arcuately-shaped engagement surface configured to engage a kingpin, and a sensor arrangement that includes at least one sensor located within the locking jaw, wherein the at least one sensor includes an accelerometer configured to sense vibrational movement of the locking jaw.

The principal objects of the embodiments as described herein are to provide a fifth wheel hitch assembly wherein the components may be monitored in a manner that provides an indication of excessively worn parts thereby allowing preventative maintenance and avoiding unsafe operational conditions. These and other advantages of the invention will be understood and appreciated by those skilled in the art by reference to the following written specification, claims and appended drawings.

DETAILED DESCRIPTION

Figure 1:
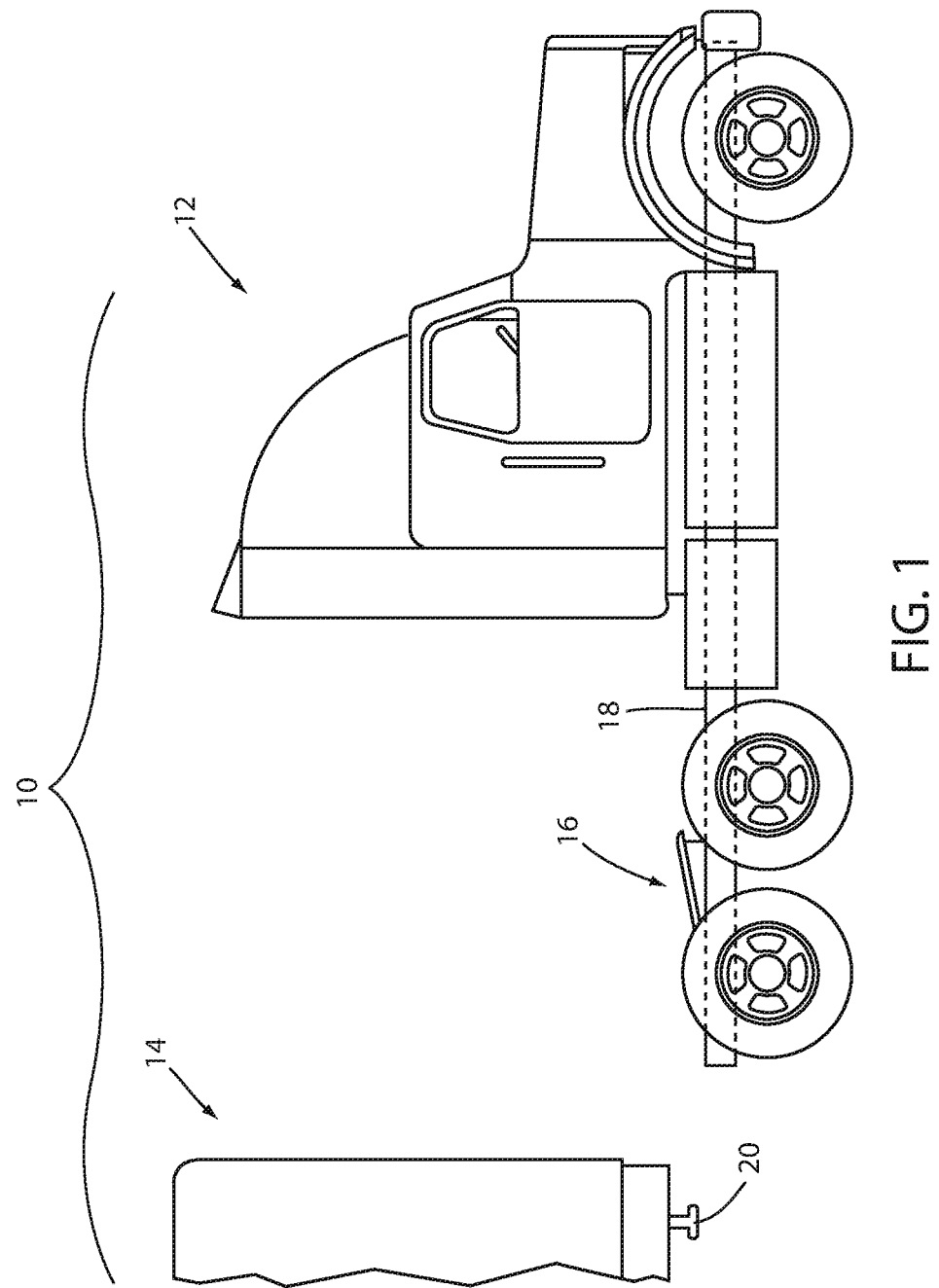
FIG. 1 is a side elevational view of a vehicle arrangement that includes a fifth wheel hitch assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

The reference 10 (FIG. 1) generally designates a vehicle arrangement that includes a towing vehicle 12 such as a semi-truck or tractor and a towed vehicle 14 such as a heavy-duty, commercial trailer. The towed vehicle 14 is coupled to the towing vehicle 12 via a fifth wheel hitch assembly 16 supported on a frame assembly 18 of the towing vehicle 12, and a kingpin 20 coupled to the towed vehicle 14.

Figure 2:
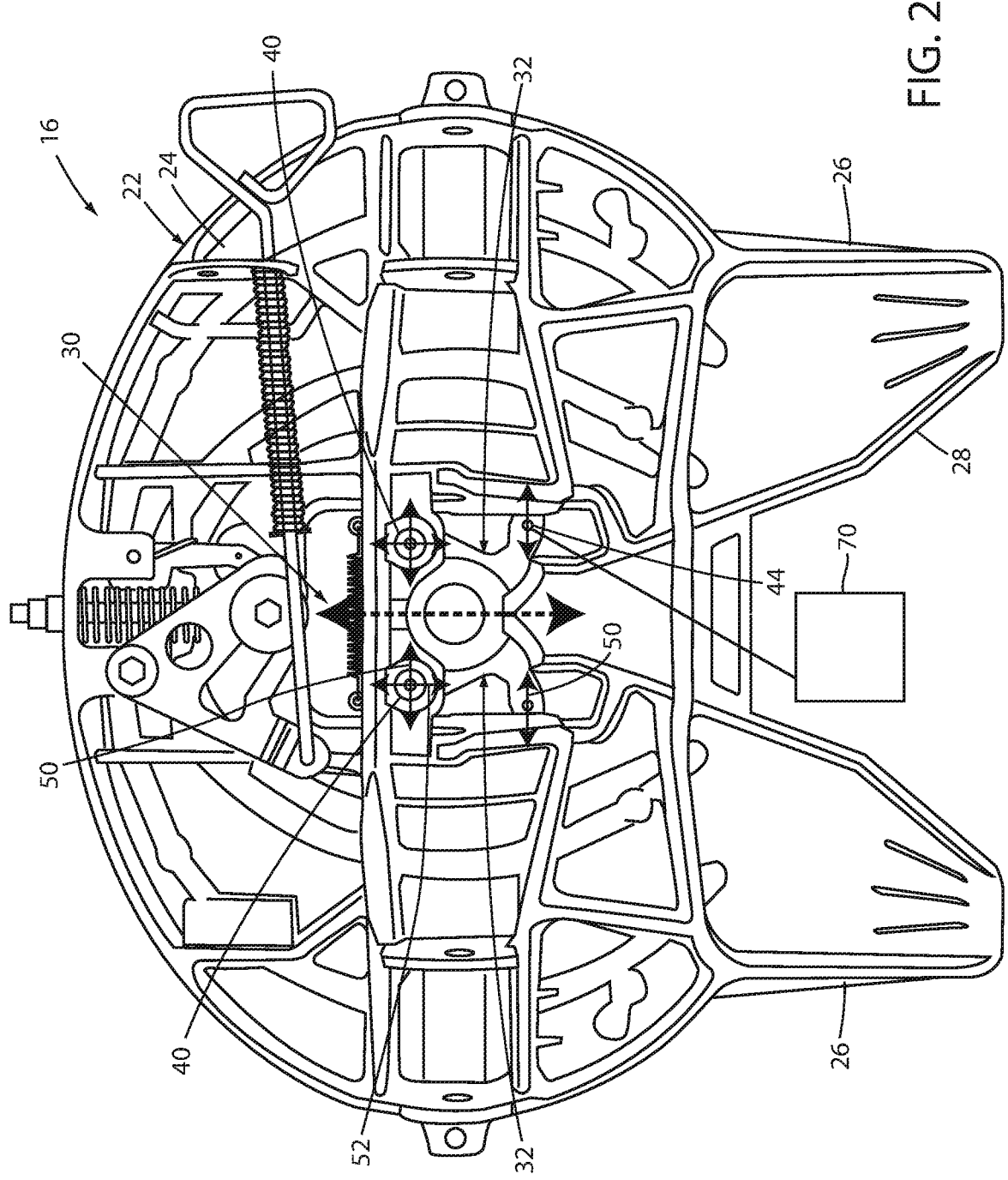
FIG. 2 is a bottom plan view of the fifth wheel hitch assembly.

As best illustrated in FIG. 2, the fifth wheel hitch assembly 16 includes a fifth wheel hitch plate 22 that includes a body portion 24 and a pair of extensions or ramps 26 that extend rearwardly from the body portion 24 and cooperate to define a throat 28 therebetween. The throat 28 is configured to receive the kingpin 20 therein in a manner well known in the art.

The fifth wheel hitch assembly 16 further includes a locking arrangement 30 that in the illustrated example includes a pair of locking jaws 32 movable between a locked position (FIG. 2) that prevents the kingpin 20 from being removed from within the throat 28, and an unlocked position (not shown) wherein the locking jaws 32 are positioned such that the kingpin 20 may be moved into and out of the throat 28 during coupling and uncoupling of the trailer 14 with the tractor 12.

Figure 3:
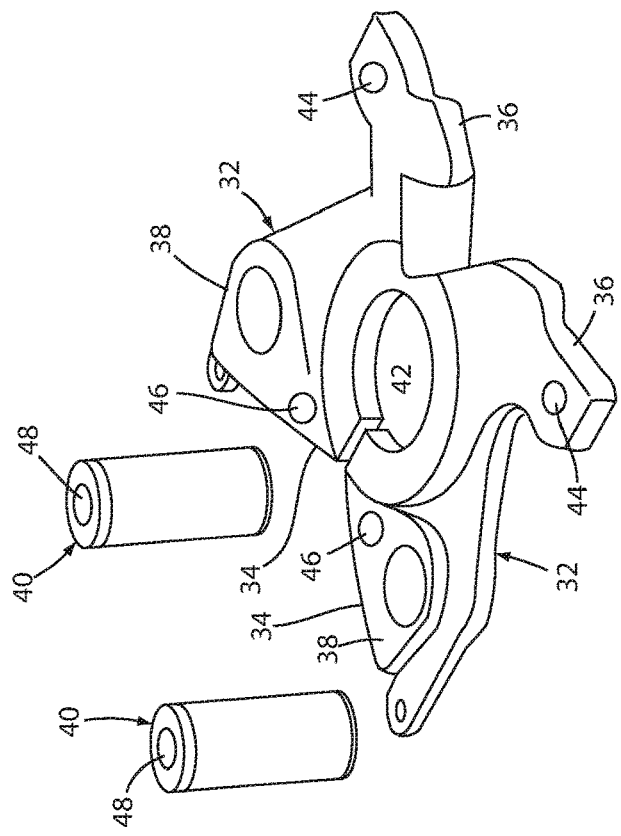
FIG. 3 is a perspective view of one embodiment of a sensor arrangement located within a locking arrangement.

Each locking jaw 32 (FIG. 3) includes a proximal first end 34 and a distal second end 36. In the illustrated example, the first end 34 of each locking jaw 32 includes an aperture 38 that receives a pivot pin 40 therein that pivotably couples the associated locking jaw 32 with the fifth wheel hitch plate 22. Each locking jaw 32 further includes an arcuately-shaped abutment surface 42 that abuts the kingpin 20 when the kingpin 20 is positioned within the throat 28 of the fifth wheel hitch plate 22 and the locking jaws 32 are in the locked position.

The fifth wheel hitch assembly 16 further includes a sensor arrangement 33 (FIG. 2) that includes a plurality of sensors located within the various components of the locking arrangement 30. In the illustrated example, each locking jaw 32 (FIG. 3) includes a first sensor 44 located proximate the second end 36, and a second sensor 46 located proximate the first end 34. In this embodiment, the sensor assembly may also include a pair of sensors 48 located within the pivot pins 40. Preferably, each sensor includes an accelerometer that is configured to monitor the acceleration or vibration of the component within which the sensor is inserted in a lateral direction 50 and/or a fore-to-aft direction 52.

Figure 4:
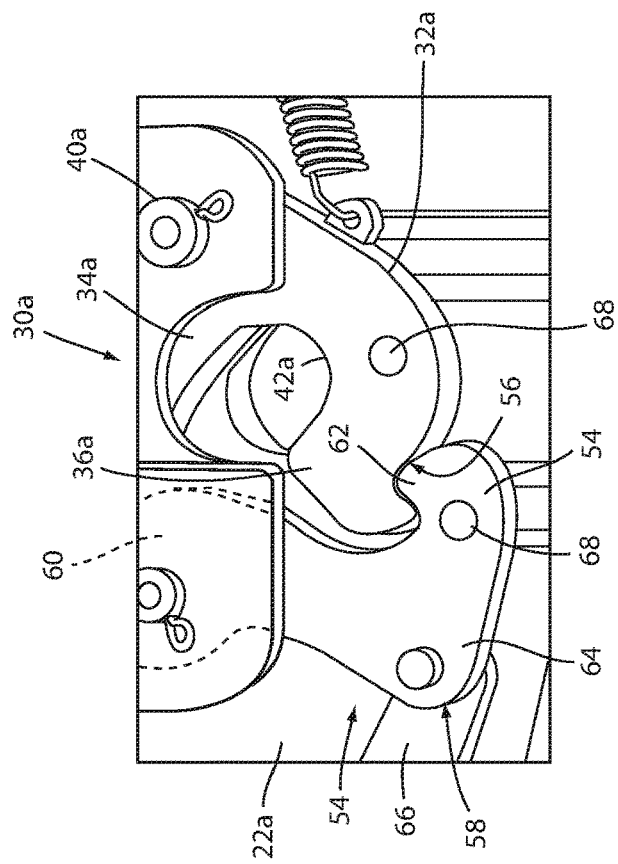
FIG. 4 is a bottom perspective view of a second embodiment of a sensor arrangement and a locking arrangement.

In an alternative embodiment, the locking arrangement 30*a* (FIG. 4) includes a single locking jaw 32*a* and a secondary locking arrangement 54 coupled thereto. Since the locking arrangement 30*a* is similar to the previously described locking arrangement 30, similar parts appearing in FIGS. 2 and 3 and in FIG. 4 respectfully are represented by the same, corresponding reference numeral, except for the suffix "a" in the numerals of the latter. In the illustrated example, the locking jaw 32*a* includes a proximal first end 34*a* pivotably coupled to the fifth wheel hitch plate 22*a* via a pivot pin 40*a*, a second end 36*a* that includes a notch 56, and an arcuately-shaped abutment surface 42*a*. The secondary lock arrangement 54 includes a locking jaw 58 having a first end 60 pivotably coupled to the fifth wheel hitch plate 22*a* via one of the pivot pins 40*a*, and a second end 62 configured to engage the notch 56 of the locking jaw 32*a*. The locking jaw 58 further includes a central portion 64 pivotably coupled to an actuator 66 that allows an operator to manually move the locking jaw 58 between and engaged position, wherein the second end 62 of the locking jaw 58 engages the notch 56 of the locking jaw 32*a*, thereby preventing the locking jaw 32*a* from moving from the locked position to the unlocked position, and an unengaged position wherein the locking jaw 58 is rotated such that the second end 62 of the locking jaw 58 does not engage the notch 56 of the locking jaw 32*a* thereby allowing the locking jaw 32*a* to move from the locked position to the unlocked position.

In the illustrated example, sensors 68 similar to the previously described sensors 44, 46, 48 are located along the length of the locking jaw 32*a* between the first end 34*a* and the second end 36*a* thereof, within the second end 62 of the locking jaw 58, and within the pivot pins 40*a*.

As best illustrated in FIG. 2, the sensor arrangement, including the sensors such as the first sensors 44, are operably coupled to a controller that is configured to receive the outputs of the sensors 44, 46, 48 associated with the various components and elements of the locking arrangement 30 and calculate baseline vibrational characteristics of those elements, and subsequently sensed vibrational characteristics of those components. These comparisons of baseline and subsequently sensed vibrational characteristics may include typical frequencies, vibrational power or amplitude, and/or vibrational spectral density. It is noted that the vibrational characteristics of each element may change over time due to wear and/or degradation of the component. Comparative analysis of the vibrational data may help to detect and isolate developing problems. Accelerations or vibrations of the component(s) may be measured via properly positioned accelerometers, and may include measuring the amplitude and/or power spectra and associated phase change plots during operation, which may then be compared with the frequencies, amplitude and phase changes of data gathered prior to use and wear of the component(s) within the overall system. For example, the abutment surface 42 of each of the lock jaws 32 frictionally engages the kingpin 20 during operation of vehicle arrangement 10, thereby leading to wear of the abutment surface 42 and the overall associated locking jaw 32. Likewise, the pivot pins 40 pivotably coupling the locking jaws 32 to the fifth wheel hitch plate 22 may begin to wear and degrade over length of time of operational use. As a result, the subsequently sensed vibrational characteristics of these elements via the sensors associated therewith will change over time. These subsequently sensed vibrational characteristics may be compared by the controller to the baseline vibrational characteristics, thereby allowing the determination of whether the component has experienced excessive wear, and/or whether standard maintenance adjustments are required. This data may be provided by the controller to maintenance personnel thereby alerting the maintenance personnel of critical component situations, and/or allowing the maintenance personnel to perform scheduled maintenance so as to avoid unsafe operating conditions. Any combination of acceleration or vibration as sensed by any combination of the sensors as shown and described herein may be utilized.

The principal objects of the embodiments as described herein are to provide a fifth wheel hitch assembly wherein the components may be monitored in a manner that provides an indication of excessively worn parts thereby allowing preventative maintenance and avoiding unsafe operational conditions.

In the foregoing description, it will be readily appreciated by those skilled in the art that modifications may be made to the disclosed embodiments without departing from the concepts as disclosed herein. Such modifications are to be considered as included in the following claims, unless these claims by the language expressly state otherwise.

The invention claimed is:

1. A fifth wheel hitch assembly, comprising:
   a fifth wheel hitch plate having a body portion and a pair of extensions extending outwardly from the body portion, wherein the extensions cooperate to form a throat therebetween;
   a locking arrangement moveable between an unlocked position where a kingpin may be moved into and out of the throat, and a locked position where the kingpin is prevented from being removed from within the throat; and
   a sensor arrangement that includes at least one sensor located within at least one component of the locking arrangement, wherein the at least one sensor includes an accelerometer configured to sense vibrational movement of the at least one component of the locking arrangement.

2. The fifth wheel hitch assembly of claim 1, wherein the at least one component of the locking arrangement includes a first locking jaw configured to abut the kingpin.

3. The fifth wheel hitch assembly of claim 2, wherein the locking jaw includes a first end pivotably coupled to the fifth wheel hitch plate and a second end, and wherein the at least one sensor is located proximate the second end of the locking jaw.

4. The fifth wheel hitch assembly of claim 2, wherein the locking arrangement comprises the first locking jaw and a second locking jaw where the first and second locking jaws cooperate to prevent the kingpin from being removed from within the throat when in the locked position, and wherein the at least one sensor includes a first sensor located in the first locking jaw and a second sensor located in the second locking jaw.

5. The fifth wheel hitch assembly of claim 4, wherein the at least one sensor includes a third sensor located in the first locking jaw and a fourth sensor located in the second locking jaw.

6. The fifth wheel hitch assembly of claim 1, wherein the at least one component of the locking arrangement includes a first pivot pin pivotably coupling a first locking jaw to the fifth wheel hitch plate.

7. The fifth wheel hitch assembly of claim 6, wherein the at least one sensor includes a first sensor located in the first pivot pin and a second sensor located in the first locking jaw.

8. The fifth wheel hitch assembly of claim 7, wherein the locking arrangement includes a second locking jaw that cooperates with the first locking jaw to prevent the kingpin from being removed from within the throat when in the locked position, and wherein at least one sensor further includes a third sensor located in the second locking jaw.

9. The fifth wheel hitch assembly of claim 6, wherein the at least one component further includes a second pivot pin, and wherein the at least one sensor includes a first sensor located within the first pivot pint and a second sensor located within the second pivot pin.

10. The fifth wheel hitch assembly of claim 1, wherein the locking arrangement includes a secondary lock arrangement movable between an engaged position where the secondary lock arrangement prevents the locking arrangement from moving from the locked position to the unlocked position, and an unengaged position where the secondary lock does not prevent the locking arrangement from moving from the locked position to the unlocked position, and wherein the sensor arrangement includes at least another sensor located within a component of the secondary lock arrangement.

11. The fifth wheel hitch assembly of claim 1, wherein the accelerometer is configured to sense an acceleration in a fore-and-aft direction.

12. The fifth wheel hitch assembly of claim 1, wherein the accelerometer is configured to sense an acceleration in a lateral direction.

13. The fifth wheel hitch assembly of claim 1, wherein the accelerometer is configured to sense an acceleration in both a fore-and-aft direction and a lateral direction.

14. The fifth wheel hitch assembly of claim 1, further comprising:
a controller operably coupled with the at least one sensor of the sensor arrangement, wherein the controller is configured to compare baseline vibrational characteristics of the at least one component of the locking arrangement and subsequently sensed vibrational characteristics of the at least one component of the locking arrangement.

15. A method for monitory wear of a locking arrangement of a fifth wheel hitch arrangement, comprising:

providing a fifth wheel hitch plate having a body portion and a pair of extensions extending outwardly from the body portion, wherein the extensions cooperate to form a throat therebetween;

providing a locking arrangement moveable between an unlocked position where a kingpin may be moved into and out of the throat, and a locked position where the kingpin is prevented from being removed from within the throat;

providing a sensor arrangement that includes at least one sensor located within at least one component of the locking arrangement, wherein the at least one sensor includes an accelerometer configured to sense vibrational movement of the at least one component of the locking arrangement;

providing a controller operably coupled with the at least one sensor of the sensor arrangement;

sensing a baseline vibrational characteristic of the at least one component and communication the baseline vibrational characteristic with the controller;

sensing a subsequent vibrational characteristic of the at least one component and communication the subsequent vibrational characteristic with the controller; and comparing the subsequent vibrational characteristic against the baseline vibrational characteristic within the controller and determining whether a threshold deviation has been met.

16. The method of claim 15, further comprising:
communicating a warning if the threshold deviation has been met.

17. The method of claim 16, wherein the warning includes a visual warning.

18. The method of claim 15, wherein the at least one component of the locking arrangement includes a first locking jaw configured to abut the kingpin.

19. The method of claim 18, wherein the locking jaw includes a first end pivotably coupled to the fifth wheel hitch plate and a second end, and wherein the at least one sensor is located proximate the second end of the locking jaw.

20. The method of claim 18, wherein the locking arrangement comprises the first locking jaw and a second locking jaw where the first and second locking jaws cooperate to prevent the kingpin from being removed from within the throat when in the locked position, and wherein the at least one sensor includes a first sensor located in the first locking jaw and second sensor located in the second locking jaw.

21. The method of claim 20, wherein the at least one sensor includes a third sensor located in the first locking jaw and a fourth sensor located in the second locking jaw.

22. The method of claim 15, wherein the at least one component of the locking arrangement includes a first pivot pin pivotably coupling a first locking jaw to the fifth wheel hitch plate.

23. The method of claim 22, wherein the at least one sensor includes a first sensor located in the first pivot pin and a second sensor located in the first locking jaw.

24. The method of claim 23, wherein the locking arrangement includes a second locking jaw that cooperates with the first locking jaw to prevent the kingpin from being removed from within the throat when in the locked position, and wherein at least one sensor further includes a third sensor located in the second locking jaw.

25. The method of claim 22, wherein the at least one component further includes a second pivot pin, and wherein the at least one sensor includes a first sensor located within the first pivot pint and a second sensor located within the second pivot pin.

26. The method of claim 15, wherein the locking arrangement includes a secondary lock arrangement movable between an engaged position where the secondary lock arrangement prevents the locking arrangement from moving from the locked position to the unlocked position, and an unengaged position where the secondary lock does not prevent the locking arrangement from moving from the locked position to the unlocked position, and wherein the sensor arrangement includes at least another sensor located within a component of the secondary lock arrangement.

27. The method of claim 15, wherein the accelerometer is configured to sense an acceleration in a fore-and-aft direction.

28. The method of claim 15, wherein the accelerometer is configured to sense an acceleration in a lateral direction.

29. The method of claim 15, wherein the accelerometer is configured to sense an acceleration in both a fore-and-aft direction and a lateral direction.

30. A locking jaw for a fifth wheel hitch assembly, comprising:
 a first end having a pivot aperture configured to receive a pin therein to pivotably couple the locking jaw to a fifth wheel hitch plate;
 a second end opposite the first end;
 an arcuately-shaped engagement surface configured to engage a kingpin; and
 a sensor arrangement that includes at least one sensor located within the locking jaw, wherein the at least one sensor includes an accelerometer configured to sense vibrational movement of the locking jaw.

31. The locking jaw of claim 30, wherein the at least one sensor includes a first sensor located proximate the second end.

32. The locking jaw of claim 31, wherein the at least one sensor includes a second sensor located proximate the first end of the sensor.

* * * * *